Sept. 25, 1928.
H. W. BUNDY
1,685,269
METHOD AND APPARATUS FOR MAKING TUBING
Filed Oct. 16, 1926 2 Sheets-Sheet 1
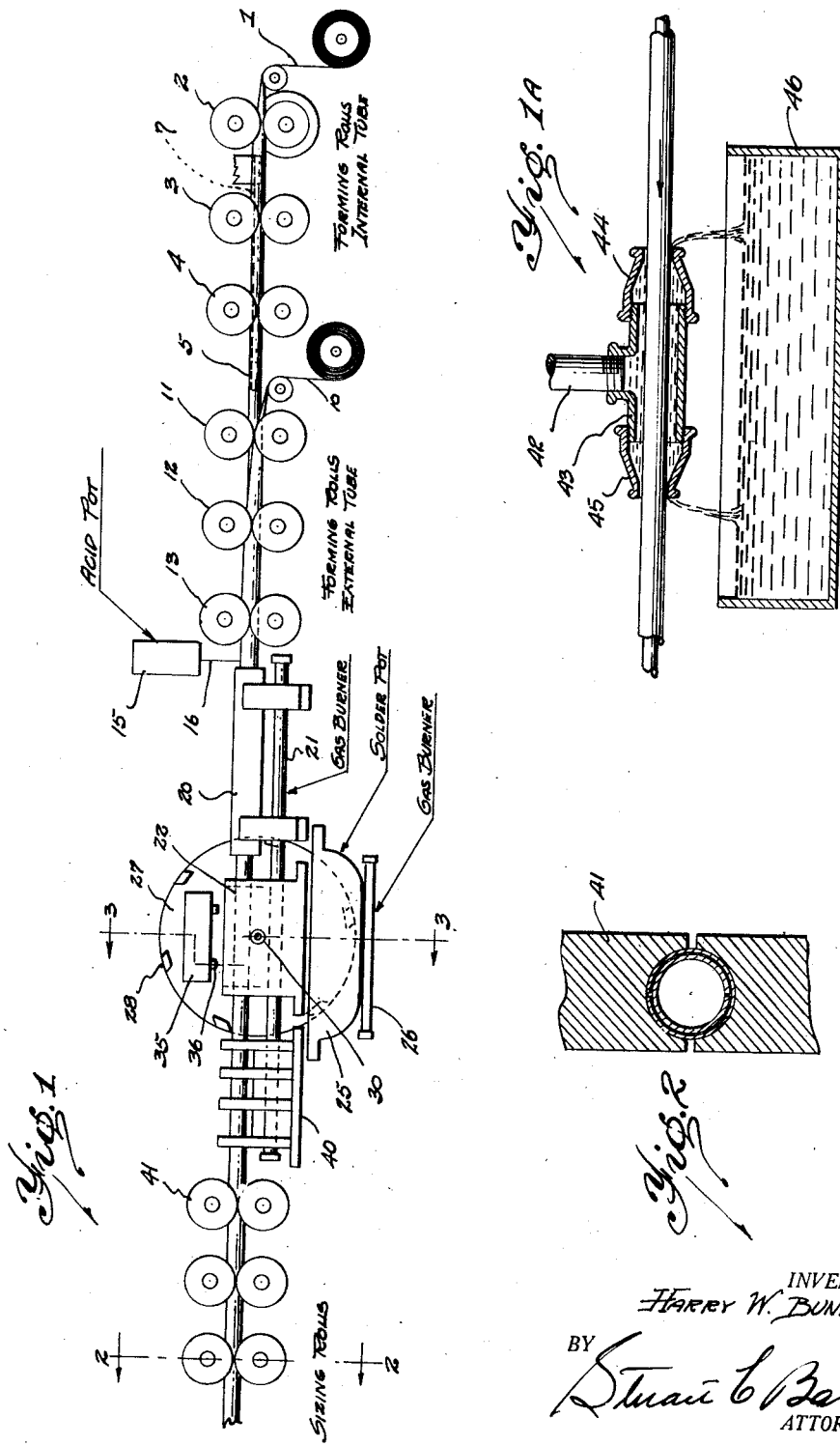
INVENTOR.
HARRY W. BUNDY.
BY
ATTORNEY.

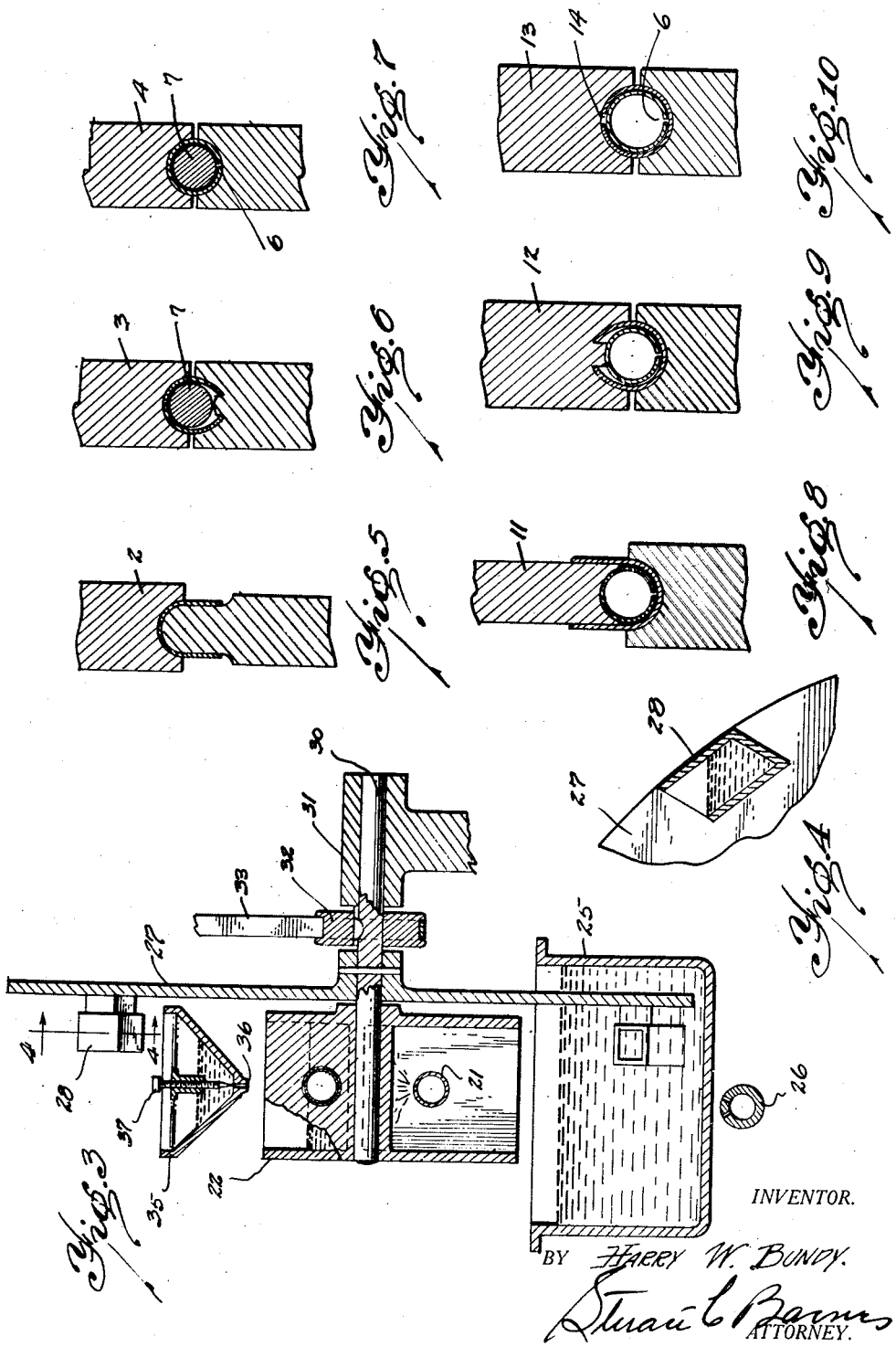

Patented Sept. 25, 1928.

1,685,269

UNITED STATES PATENT OFFICE.

HARRY W. BUNDY, OF DETROIT, MICHIGAN.

METHOD AND APPARATUS FOR MAKING TUBING.

Application filed October 16, 1926. Serial No. 141,955.

This invention has to do with a method and apparatus for making tubing, and it is devoted more especially to longitudinally drawn tubing of the multi-ply type.

Tubing of this type is advantageous for such things as gasoline lines and radiator over-flow pipes, and the like, for automobiles. It is desirable, and many manufacturers specify, that the tubing be of a non-corrodible nature. Tubing made entirely of non-corrodible metal, such as copper, is relatively expensive, while multi-ply tubing having an inner ply of non-corrodible metal, and an outer ply of a more base metal can be produced at a considerably lower cost. The inner ply of such tubes may be of quite thin material, and the outer ply can be of sufficient thickness to give the completed tube its needed strength.

According to the present invention, flat strip stock is drawn into tube shape, one strip of stock of non-corrodible metal is used for the inner ply, and another strip of stock is used for the outer ply. The strips are drawn into tube shape separately, and the apparatus includes a set of forming rolls for each strip. During the formation of the outer ply, such ply is disposed with relation to the inner ply so that the two may be treated simultaneously by a soldering and final sizing mechanism, and the apparatus includes a single soldering and sizing mechanism which is common to both plies. This application is a continuation in part of application Serial No. 37,970, filed June 18, 1925.

The invention is shown in the accompanying drawings, wherein Fig. 1 is a diagrammatic view showing the forming rolls for the two plies, the soldering mechanism and the sizing mechanism.

Fig. 1A is an enlarged view partly in section, showing how the completed tubing may be cooled.

Fig. 2 is a section taken on the line 2—2 of Fig. 1, showing the tube as finally shaped.

Fig. 3 is a section taken on the line 3—3 of Fig. 1, showing the soldering mechanism.

Fig. 4 is a sectional view on line 4—4 of Fig. 3, showing how molten solder is elevated by the soldering mechanism.

Figs. 5, 6 and 7 are sectional views taken through the forming rolls for the inner tubes showing the progression of such forming.

Figs. 8, 9 and 10 are sectional views taken through the forming rolls for the outer tube showing how it is formed around the inner tube.

Referring to the drawings, and particularly to Fig. 1, strip stock of non-corrodible metal 1, is drawn from a roll through a succession of forming rolls. The first pair of forming rolls 2 shape the stock, as shown in Fig. 5; the second pair of forming rolls 3 perform the next step of shaping the stock, as shown in Fig. 6, and the third pair of forming rolls 4 shape the stock, as shown in Fig. 7. At the point reference 5, the inner tube is substantially in the form shown in Fig. 7, and the edges of the tube, as shown in 6 (Fig. 7) are slightly spaced from each other. The inner strip is preferably formed around an arbor 7, this arbor assisting in nicely shaping the inner ply.

Strip stock 10 of a relatively cheap metal for the outer ply is drawn from a roll through a succession of forming rolls, and the formed inner tube also passes through these rolls. The first pair of rolls 11 shape the stock, as shown in Fig. 8, and the next two pairs of forming rolls 12 and 13 form the stock, as shown in Figs. 9 and 10. It will be noted that the outer ply is formed around the inner ply, the inner ply thus acting as an arbor for the outer ply. The meeting edges of the plies are disposed on opposite sides of the tubing. The edges of the outer ply, as shown in 14, are spaced from each other a distance which is somewhat greater than the spacing between the edges of the inner ply. This affords a rather loose fit between the two plies so that acid and molten solder may readily move in between the plies. Both strips of stock are preferably tinned before they are formed by the apparatus.

Both sets of forming rolls also act as advancing rolls, and the speed with which the rolls rotate is such that the inner and outer tubes are advanced at a uniform speed. As the tubing leaves the forming rolls 13, it is substantially in the form shown in Fig. 10, and at this point acid may be applied in preparation for the welding step. This can be accomplished by means of an acid pot 15, out of which flows a regulatable stream of acid 16, in such a way that the acid runs at between the edges of the outer tube, between the inner and outer plies, and between the edges of the inner tube. If it should be found expedient, acid may be applied to the strips before they are acted upon by the forming rolls.

The tubing thus formed now moves into the soldering mechanism. This mechanism includes a heating die 20, below which is disposed a gas burner 21. From this die, the tubing passes through a soldering pot 22 which contains molten solder. The level of the molten solder of this pot is preferably maintained at substantially the same height as the upper portion of the tube (Fig. 3). The burner 21 may be elongated so as to keep the solder in the pot 22 in a molten condition, or if desired, a separate burner can be used.

For the purpose of supplying solder to the pot 22, a second supply pot 25 of solder is provided, and this is heated by gas burner 26. The solder in this pot is elevated by means of a rotating disk or wheel 27 carrying a number of small buckets 28. A sectional view of one of the buckets is shown in Fig. 4. This rotating elevator is fixed to a shaft 30 which is carried in a suitable support 31, and which is rotated by means of a pulley 32 and belt 33 which extends to any suitable power device (not shown).

As the elevator operates, molten solder is dipped out of the pot 25 and then deposited above the solder pot 22 in a sort of trough 35. This trough has outlets 36 which are controllable by needle valves 37 (Fig. 3) so that just the right amount of molten solder will flow into the pot 22. The solder flowing through the openings drops upon the tube and enters in between the walls of the two tubes and between the spaced edges of the inner ply.

The tubing now passes out of the solder pot 22, and is caused to pass through a set of wiper dies 40. These dies progressively diminish in size and remove any excess solder which may cling to the exterior of the tube. The solder may be kept in a heated condition while the tube passes through the dies by the burner 21, which is of sufficient length for the purpose. A separate burner can be used if the same is found to be expedient.

After the tube passes through the wiper dies it is caused to pass through a series of sizing rolls 41. These rolls progressively decrease the size of the tubing so that the two plies tightly engage each other, and so that the meeting edges of both the inner and outer plies come together. At this point the tube and solder is sufficiently cooled so that the tube retains its final form. Fig. 2 shows the last set of sizing rolls and shows in cross section the final form of the tubing.

When the tube is thus finally shaped, it may be cooled by means of a structure depicted in Fig. 1A. This cooling apparatus includes a water supply pipe 42, upon the end of which is secured the T-fitting 43, having at each end bushings 44 and 45. The tubing passes through the bushings and T-fitting where it is cooled by a supply of water coming through the pipe 42. Below the cooling apparatus is a tank 46 for receiving the water and the same may be either discharged as waste water or it may be used over again by the use of suitable pump mechanism for causing the same to return to the supply pipe 42.

What I claim is:

1. An apparatus for making multi-ply, longitudinally-drawn tubing, comprising a set of forming rolls for drawing a strip of stock into a tubular inner ply, a second set of forming rolls adapted to permit the tubular inner ply to pass therethrough and for forming a second strip of stock into a tubular outer ply around the inner ply, said second set of rolls being positioned forwardly of the first whereby the formed inner ply passes through the second set, and means for soldering the two plies together.

2. An apparatus for making multi-ply, longiudinally-drawn tubing, comprising a set of forming rolls for drawing a strip of stock into a tubular inner ply, a second set of forming rolls for forming a second strip of stock into a tubular outer ply, said second set of forming rolls being positioned forwardly of the first set, and being adapted to permit the formed inner ply to pass therethrough, means for applying solder to the two plies, and means for compressing the plies together to complete the tube.

3. The method of making multi-ply tubing which comprises utilizing a plurality of supplies of flat strip metal stock, drawing the stock from the supplies simultaneously with a uniform rate of movement, rolling one strip of stock transversely into tube form while the same is moving with the edges of the stock in close proximity, thus forming a substantially complete tube, drawing another strip of stock to the first at a point in advance of the location where the first mentioned strip is formed into a substantially complete tube, rolling the second mentioned strip transversely around the tubular form of the first with a rolling movement opposite to that movement of the rolling of the first mentioned strip, whereby the longitudinal edges of the second strip are in close proximity and diametrically opposite the edges of the first mentioned strip, then securing the tubes together by molten sealing metal and preventing this molten sealing metal from entering in the inside of the tube in material quantities by reason of the longitudinal edges of the first mentioned strip being in close proximity.

In testimony whereof I have affixed my signature.

HARRY W. BUNDY.